(12) United States Patent
Okuda et al.

(10) Patent No.: US 12,103,282 B2
(45) Date of Patent: Oct. 1, 2024

(54) DECORATIVE FILM FOR INSERT MOLDING, METHOD FOR MANUFACTURING DECORATIVE FILM FOR INSERT MOLDING, AND METHOD FOR MANUFACTURING RESIN MOLDED PRODUCT

(71) Applicant: NISSHA CO., LTD., Kyoto (JP)

(72) Inventors: Michiyasu Okuda, Kyoto (JP); Yusuke Ueno, Kyoto (JP); Shintaro Kuwasaka, Kyoto (JP)

(73) Assignee: NISSHA CO., LTD, Kyoto (JP)

( * ) Notice: Subject to any disclaimer, the term of this patent is extended or adjusted under 35 U.S.C. 154(b) by 0 days.

(21) Appl. No.: 18/552,757

(22) PCT Filed: Feb. 9, 2022

(86) PCT No.: PCT/JP2022/005083
§ 371 (c)(1),
(2) Date: Sep. 27, 2023

(87) PCT Pub. No.: WO2022/209328
PCT Pub. Date: Oct. 6, 2022

(65) Prior Publication Data
US 2024/0083153 A1    Mar. 14, 2024

(30) Foreign Application Priority Data
Mar. 29, 2021   (JP) ................... 2021-054945

(51) Int. Cl.
*B60R 13/02* (2006.01)
*B29C 45/14* (2006.01)
(Continued)

(52) U.S. Cl.
CPC ...... *B32B 27/365* (2013.01); *B29C 45/14008* (2013.01); *B29C 45/14688* (2013.01);
(Continued)

(58) Field of Classification Search
CPC ......... B60R 13/00; B60R 13/02; B60R 13/04; B29C 45/14688; B29C 45/16;
(Continued)

(56) References Cited

U.S. PATENT DOCUMENTS

| | | | | |
|---|---|---|---|---|
| 2009/0257241 A1* | 10/2009 | Meinke | ................ | B60Q 1/543 362/546 |
| 2010/0154261 A1* | 6/2010 | Bozlo | ................ | G09F 21/049 156/247 |
| 2013/0101793 A1* | 4/2013 | Saitou | ................ | B44C 1/1725 428/141 |
| 2013/0120676 A1* | 5/2013 | Iwahashi | ................ | B42D 15/00 359/465 |

(Continued)

FOREIGN PATENT DOCUMENTS

| | | |
|---|---|---|
| JP | H085096 A | 1/1996 |
| JP | 2004042510 A | 2/2004 |

(Continued)

*Primary Examiner* — Z. Jim Yang
(74) *Attorney, Agent, or Firm* — Alleman Hall & Tuttle LLP

(57) ABSTRACT

A decorative film for insert molding includes a gravure-printed graphic layer and a light-transmissive patterned layer and has high dimensional accuracy and delicate and rich tone expression. A multilayer film includes first and second layers containing an acrylic-based resin, and a polycarbonate resin layer located between the first and second layers and containing a polycarbonate-based resin. The multilayer film is transmissive to visible light. A first gravure print layer is located on a first main surface of the multilayer film, includes a first graphic layer, and is transmissive. A backer film contains a polycarbonate-based resin and is transmissive. The first graphic layer includes a first image at a predetermined position in a three-dimensional shape of a decorative film formed in the three-dimensional shape. A patterned layer includes a pattern patterned to allow visible light to pass through the first image at the predetermined position in the three-dimensional shape.

11 Claims, 10 Drawing Sheets

(51) Int. Cl.
- *B32B 7/12* (2006.01)
- *B32B 27/08* (2006.01)
- *B32B 27/30* (2006.01)
- *B32B 27/36* (2006.01)

(52) U.S. Cl.
CPC .......... *B29C 45/14811* (2013.01); *B32B 7/12* (2013.01); *B32B 27/08* (2013.01); *B32B 27/308* (2013.01); *B60R 13/02* (2013.01); *B32B 2250/24* (2013.01); *B32B 2255/10* (2013.01); *B32B 2255/26* (2013.01); *B32B 2255/28* (2013.01); *B32B 2307/412* (2013.01); *B32B 2307/538* (2013.01)

(58) Field of Classification Search
CPC ................ B29C 45/1671; B32B 3/266; B32B 2307/538; Y10T 428/24273–24331; Y10T 428/24355; Y10T 428/24364; B29L 2031/3005–3041; B29L 2031/722
See application file for complete search history.

(56) References Cited

U.S. PATENT DOCUMENTS

| | | | |
|---|---|---|---|
| 2018/0297252 A1* | 10/2018 | Kashiwagi | B32B 27/365 |
| 2019/0047246 A1* | 2/2019 | Bayer | B32B 27/32 |
| 2020/0114554 A1* | 4/2020 | Fino | B29C 33/424 |
| 2021/0107400 A1* | 4/2021 | Erler | B60R 13/02 |
| 2021/0284063 A1* | 9/2021 | Wang | B60Q 3/54 |
| 2022/0001645 A1* | 1/2022 | Fujii | B32B 27/306 |
| 2022/0162468 A1* | 5/2022 | Ono | C09D 4/00 |
| 2022/0227312 A1* | 7/2022 | Zemmrich | B41M 3/00 |
| 2022/0339923 A1* | 10/2022 | Nakajima | B32B 37/02 |
| 2023/0405984 A1* | 12/2023 | Okuda | B29C 45/14688 |

FOREIGN PATENT DOCUMENTS

| | | |
|---|---|---|
| JP | 2007276366 A | 10/2007 |
| JP | 2010082870 A | 4/2010 |
| JP | 2019181920 A | 10/2019 |
| JP | 2019189043 A | 10/2019 |
| JP | 2021178431 A | 11/2021 |
| WO | 2016174989 A1 | 11/2016 |
| WO | 2017164060 A1 | 9/2017 |

* cited by examiner

DECORATIVE FILM FOR INSERT MOLDING, METHOD FOR MANUFACTURING DECORATIVE FILM FOR INSERT MOLDING, AND METHOD FOR MANUFACTURING RESIN MOLDED PRODUCT

TECHNICAL FIELD

The present invention relates to a decorative film for insert molding, a method for manufacturing a decorative film for insert molding, and a method for manufacturing a resin molded product, and more particularly, to a decorative film for insert molding having a gravure-printed decorative graphic element that is transmissive to visible light, a method for manufacturing a decorative film for insert molding, and a method for manufacturing a resin molded product.

BACKGROUND

Examples of known decorative films for insert molding include a decorative film for insert molding described in Patent Literature 1 (Japanese Examined Patent Application Publication No. 8-5096). The decorative film for insert molding described in Patent Literature 1 includes, on its film surface, a first light-transmissive substrate having a printed decorative graphic element, a second light-transmissive substrate, and a graphic layer between the first and second light-transmissive substrates.

CITATION LIST

Patent Literature

Patent Literature 1: Japanese Examined Patent Application Publication No. 8-5096

BRIEF SUMMARY

Technical Problem

Known decorative films for insert molding include graphic elements printed by, for example, screen printing, which may provide poor tone expression and may have difficulty in reproducing designs of, for example, beautiful wood grain or gradation. Decorative films for insert molding thus mostly have a monotonous design with a graphic element drawn with hairlines or a solid color.

Additionally, such known decorative films for insert molding may have difficulty in overlaying different graphic elements in multiple graphic layers on each other into a single integrated beautiful design.

One or more aspects of the present invention are directed to a decorative film for insert molding including a gravure-printed graphic layer and a light-transmissive patterned layer and having high dimensional accuracy and delicate and rich tone expression.

Solution to Problem

In response to the above issue, aspects of the present invention are described below. Any of these aspects may be combined as appropriate.

A decorative film according to an aspect of the present invention is a decorative film for insert molding to be formed in a three-dimensional shape before insert molding. The decorative film includes a multilayer film, a first gravure print layer, a backer film, and a light-transmissive patterned layer. The multilayer film has a first main surface and a second main surface. The multilayer film includes a first acrylic resin layer containing an acrylic-based resin, a second acrylic resin layer containing an acrylic-based resin, and a polycarbonate resin layer located between the first acrylic resin layer and the second acrylic resin layer and containing a polycarbonate-based resin. The multilayer film is transmissive to visible light. The first gravure print layer is located on the first main surface of the multilayer film, includes a first graphic layer including a gravure-printed graphic element, and is transmissive to visible light. The lamination adhesive layer is bonded to the first gravure print layer and includes an adhesive transmissive to visible light. The backer film contains a polycarbonate-based resin, is bonded to the first gravure print layer with the lamination adhesive layer, and is transmissive to visible light. The light-transmissive patterned layer is located on the backer film and includes a light-transmissive pattern transmissive to visible light. The first graphic layer includes a first image at a predetermined position. The light-transmissive patterned layer is patterned to allow visible light to pass through the first image at the predetermined position.

In the decorative film for insert molding with this structure, the multilayer film with the multilayer structure including the polycarbonate resin layer is less likely to shrink when the first gravure print layer is printed and dried. The polycarbonate resin layer in the multilayer film and the backer film containing the polycarbonate-based resin increase the heat resistance and reduce ink flow in the first gravure print layer in manufacturing a polycarbonate resin molded product. Visible light can thus be accurately guided through the light-transmissive pattern to the first image in the first gravure print layer. The first image transmissive to visible light can be formed in an intended portion of the resin molded product.

A polycarbonate product herein refers to a product formed using a polycarbonate-based resin as a material for injection molding.

The decorative film described above may further include a second gravure print layer on the second main surface of the multilayer film. The second gravure print layer may include a second graphic layer including a gravure-printed graphic element. The second gravure print layer may include a second image at a position with respect to the first image. The decorative film with this structure can reduce misalignment between the first image and the second image during printing and drying.

In the decorative film described above, the second gravure print layer may have surface roughness with a distance between a highest peak and a lowest valley being greater than or equal to 20 μm. The lamination adhesive layer may have a thickness greater than or equal to 16 μm. The decorative film with this structure can reduce air entrapment caused by the rough second gravure print layer with the lamination adhesive layer.

In the decorative film described above, the first gravure print layer may include a primer layer between the first graphic layer and the lamination adhesive layer. The primer layer may contain a thermoplastic resin. The primer layer may be transmissive to visible light. The decorative film with this structure includes the primer layer protecting the first graphic layer.

A method according to an aspect of the present invention is a method for manufacturing a decorative film for insert molding to be formed in a three-dimensional shape before insert molding. The method includes printing, by gravure printing, a first gravure print layer transmissive to visible light on a first main surface of a multilayer film. The multilayer film includes a first acrylic resin layer containing an acrylic-based resin, a second acrylic resin layer containing an acrylic-based resin, and a polycarbonate resin layer located between the first acrylic resin layer and the second acrylic resin layer and containing a polycarbonate-based resin. The multilayer is transmissive to visible light. The method includes forming an elongated first member by dry laminating a backer film and the multilayer film including the first gravure print layer at a temperature of 100° C. or lower, with a lamination adhesive layer placed between the backer film and the multilayer film. The backer film contains a polycarbonate-based resin and is transmissive to visible light. The method includes forming a light-transmissive patterned layer on the backer film in the first member. The light-transmissive patterned layer includes a light-transmissive pattern transmissive to visible light. The first gravure print layer includes a first image at a predetermined position in the three-dimensional shape of the decorative film formed in the three-dimensional shape. The light-transmissive pattern in the light-transmissive patterned layer is patterned to allow visible light to pass through the first image at the predetermined position in the three-dimensional shape.

With the above method for manufacturing the decorative film for insert molding, the multilayer film with the multilayer structure including the polycarbonate resin layer is less likely to shrink when the gravure print layer is printed and dried in the printing of the first gravure print layer. The polycarbonate resin layer in the multilayer film and the backer film containing the polycarbonate-based resin increase the heat resistance and reduce ink flow in the first gravure print layer in manufacturing a polycarbonate resin molded product. Visible light can thus be accurately guided through the light-transmissive pattern to the first image in the first gravure print layer. The first image transmissive to visible light can be formed in an intended portion of the resin molded product.

In the method described above, the printing the first gravure print layer on the first main surface of the multilayer film may include printing, by gravure printing, a second gravure print layer on a second main surface of the multilayer film at a same time as the first gravure print layer. With the above method for manufacturing the decorative film for insert molding, the first image in the first gravure print layer can be formed with high positional accuracy with respect to the second image in the second gravure print layer. Visible light can thus be accurately guided through the light-transmissive pattern to the first image in the first gravure print layer and the second image in the second gravure print layer or to a portion adjacent to the second image. In other words, visible light passes through intended portions of the resin molded product to accurately form the first image and the second image in the second gravure print layer at positions at which the visible light passes through.

The method described above further includes cutting the first member into a shorter second member before the forming the light-transmissive patterned layer. The forming the light-transmissive patterned layer includes forming the light-transmissive patterned layer on the backer film in the second member. With the above method for manufacturing the decorative film for insert molding, the second member as a sheet allows the first image and the second image to be accurately aligned with the light-transmissive pattern.

In the method described above, the forming the light-transmissive patterned layer includes forming the light-transmissive patterned layer on the backer film in the first member with roll-to-roll processing. With the above method for manufacturing the decorative film for insert molding, many light-transmissive patterned layers can be formed quickly and repeatedly.

A method according to an aspect of the present invention is a method for manufacturing a resin molded product. The method includes forming the decorative film described above in a three-dimensional shape, trimming an excess portion of the decorative film, and injecting a polycarbonate-based resin. The trimming an excess portion of the decorative film includes trimming an excess portion of the decorative film formed in the three-dimensional shape. The resin molded product obtained with the above method has a three-dimensional shape with a specific portion including the first image and allows visible light passing through the light-transmissive pattern to pass through the first image or a portion adjacent to the first image. With the above method for manufacturing the resin mold product, the polycarbonate resin layer in the multilayer film and the backer film containing the polycarbonate-based resin increase the heat resistance and reduce ink flow in the first gravure print layer during injection of the polycarbonate-based resin. Visible light can thus be accurately guided through the light-transmissive pattern to the first image in the first gravure print layer or to a portion adjacent to the first image. In other words, visible light passes through an intended portion of the resin molded product to accurately form the first image at the position at which the visible light passes through.

Advantageous Effects

The decorative film for insert molding according to the above aspects of the present invention is usable in a polycarbonate resin molded product including a gravure-printed graphic layer and a light-transmissive patterned layer with high dimensional accuracy and delicate and rich tone expression. The method for manufacturing the decorative film for insert molding according to the above aspects of the present invention allows the production of the decorative film for insert molding according to the above aspects of the present invention. The method for manufacturing the resin molded product according to the above aspects of the present invention allows the production of the polycarbonate resin molded product including the decorative film for insert molding according to the above aspects of the present invention.

DETAILED DESCRIPTION (1) Use of Insert Molding Decorative Film

Figure 1A:
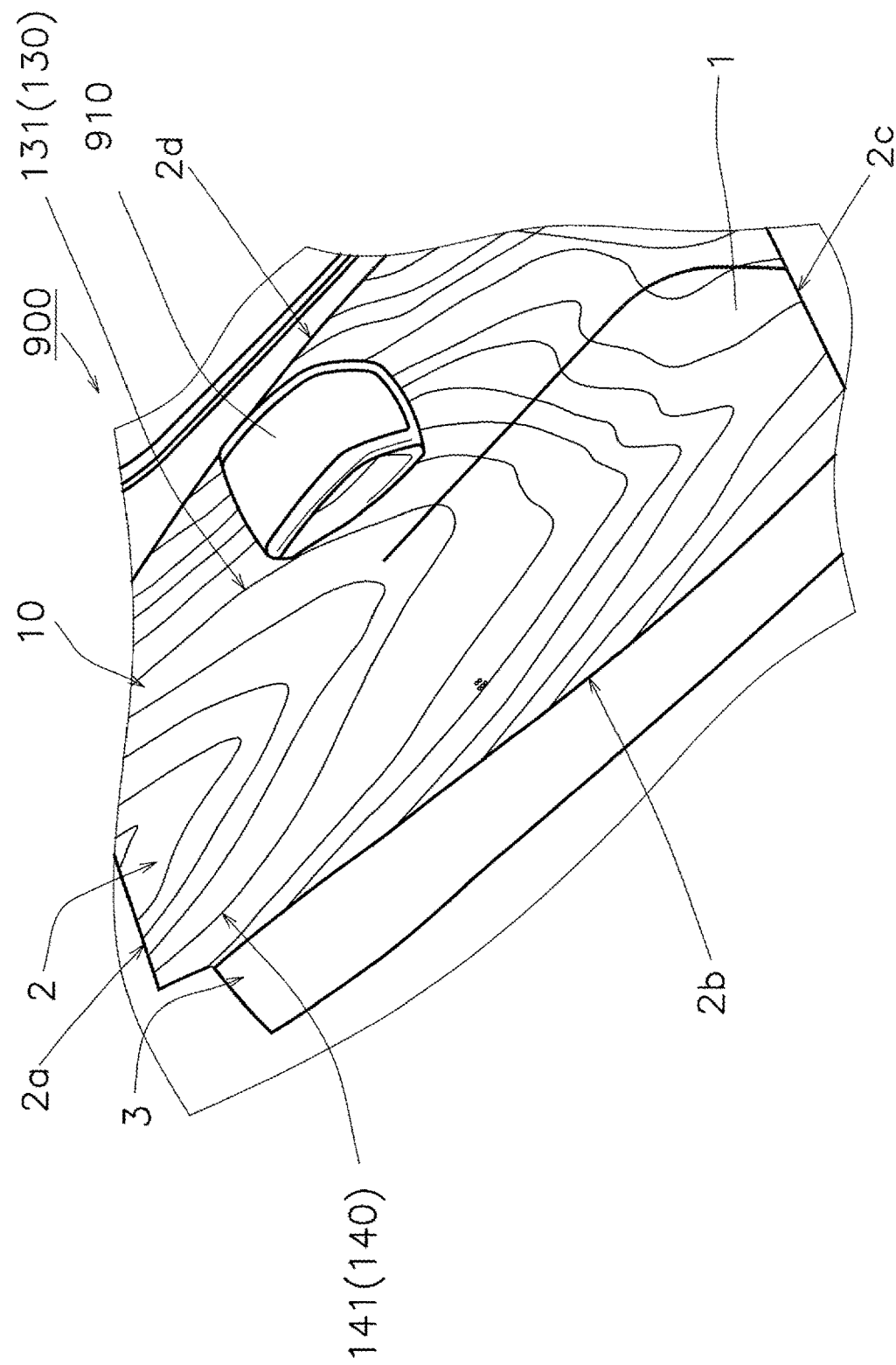
FIG. 1A is a perspective view of a display panel including an insert molding decorative film according to an embodiment.
Figure 1B:
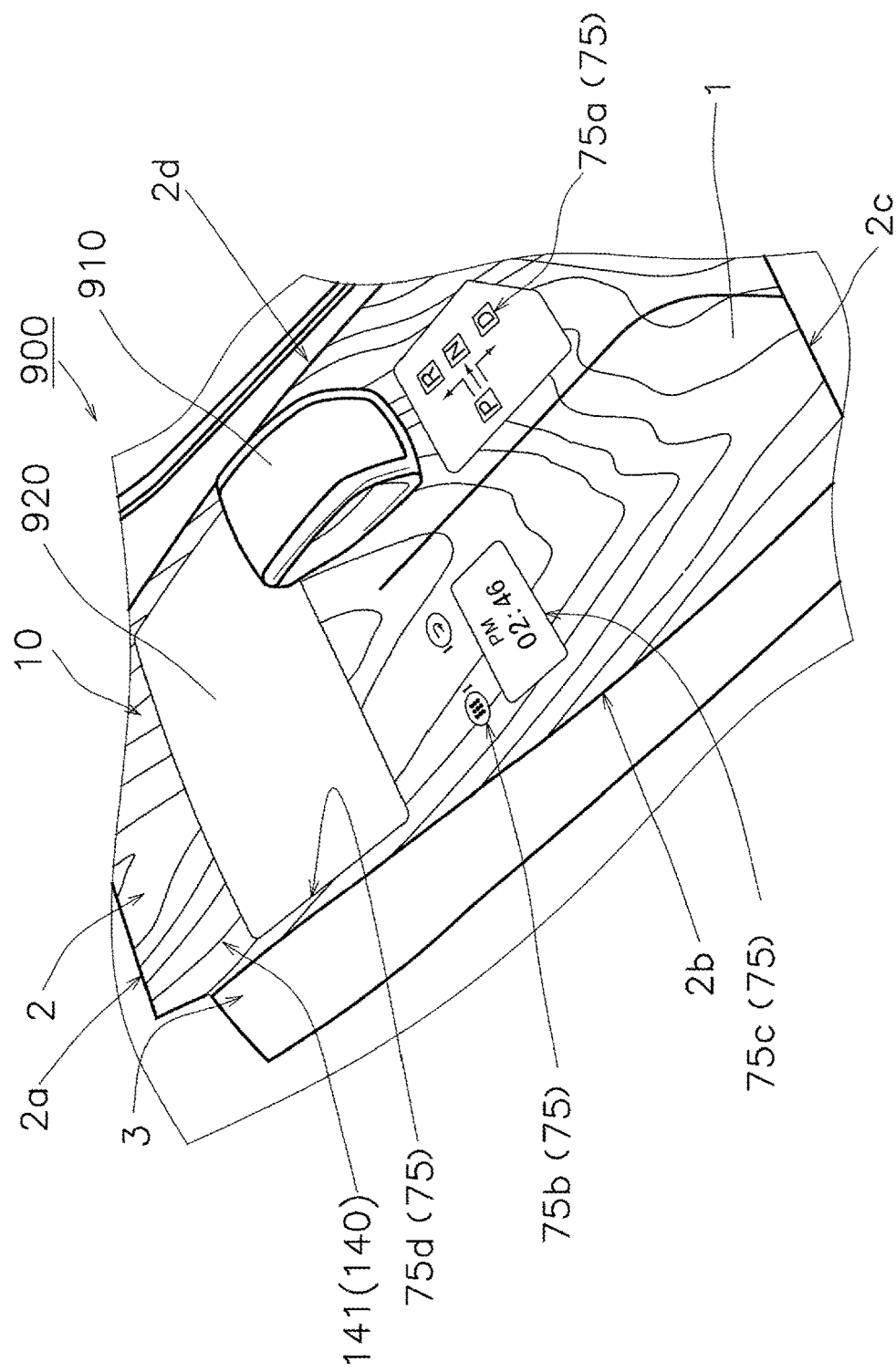
FIG. 1B is a perspective view of the display panel with visible light passing through portions around alphabets and an icon.

FIGS. 1A and 1B each show an example of a display panel 1 attached to a center console 900 in an automobile. The display panel 1 is a part of the center console 900 and is a polycarbonate resin molded product. The display panel 1 has a three-dimensional shape that fits the shape of the center console 900. The center console 900 includes a gear stick 910. The gear stick 910 is an operation lever for an automatic transmission (not shown). The display panel 1 has, for example, an opening (not shown) through which the gear stick 910 is placed.

The display panel 1 is decorated with a decorative film 10 for insert molding (insert molding decorative film 10). The insert molding decorative film 10 is formed in a three-dimensional shape to fit the shape of a resin molded product (the display panel 1 in this example) before insert molding. The insert molding decorative film 10 includes, for decoration, a first image 130, a second image 140, and a light-transmissive pattern 75.

Figure 2:
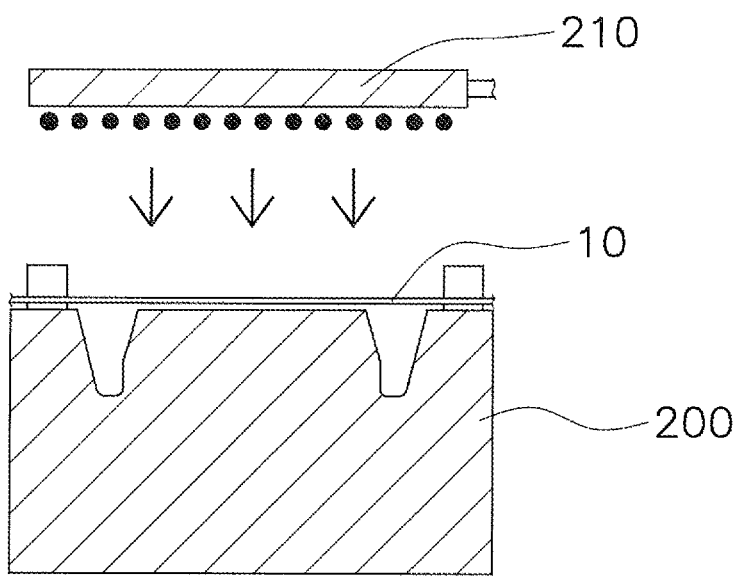
FIG. 2 is a schematic cross-sectional view of the insert molding decorative film being heated for forming.

In the present embodiment, the first image 130 has, for example, a wood grain pattern including dark brown portions and light brown portions. In other words, the wood grain pattern is an annual ring pattern. The wood grain pattern includes the dark brown portions as portions of a tree with dense tissue from growth in the winter, and the light brown portions as portions of the tree with coarse tissue from growth in the summer. In FIGS. 1A to 2, curves 131 schematically indicate the dark brown portions of the wood grain pattern.

In the present embodiment, the second image 140 is, for example, an image of the surface roughness of the wood grain pattern. The dark brown portions of the wood grain pattern indicated by the curves 131 with the dense tissue are harder than the light brown portions and tend to protrude more easily than the light brown portions after the wood is processed. A panel produced by processing wood may have a relief pattern with raised dark brown portions. To produce a resin molded product that resembles such a panel produced by processing wood, a convex pattern is overlaid on the curves 131. A concave pattern is further overlaid on the light brown portions between the curves 131 adjacent to each other. The second image is a rough wood grain pattern 141 combining the convex pattern and the concave pattern described above.

The light-transmissive pattern 75 includes, for example, a display for alphabets 75*a* indicating multiple operating positions (range) of the gear stick 910 and an icon 75*b* for operating a device in the automobile. The alphabets 75*a* are each surrounded by a rectangular frame. The light-transmissive pattern 75 includes, for example, a rectangular display for displaying the alphabets 75*a*. The icon 75*b* is surrounded by an oval frame. A light-transmissive patterned layer 71 includes, for example, a display 75*c* for a digital clock and a rectangular pattern 75*d* transmissive to visible light emitted from a liquid crystal display screen 920.

The display panel 1 includes a flat portion 2 with, for example, the alphabets 75*a*, the icon 75*b*, and the rough wood grain pattern 141, and a hem 3 around the flat portion 2. The hem 3 is bent toward the body of the automobile with respect to the flat portion 2. The flat portion 2 has, as a boundary with the hem 3, a first end 2*a* and a third end 2*c* in the travelling direction of the automobile (hereafter referred to as X-direction) and a second end 2*b* and a fourth end 2*d* in a direction in which the driver's seat and the passenger's seat are aligned (hereafter referred to as Y-direction).

The first end 2*a*, the second end 2*b*, the third end 2*c*, and the fourth end 2*d* of the flat portion 2 are the outer edges of the rough wood grain pattern 141, and may be the outer edges of the second image 140.

(2) Method for Manufacturing Resin Molded Product Using Insert Molding Decorative Film FIGS. 2 to 7 show an overview of a method for manufacturing a resin molded product using the insert molding decorative film 10. The insert molding decorative film 10 is formed in a three-dimensional shape before insert molding to be used for insert molding. For decorating the display panel 1, for example, the insert molding decorative film 10 is formed to fit the three-dimensional shape of the display panel 1 before being inserted into a mold for injection molding of the display panel 1.

Figure 3:
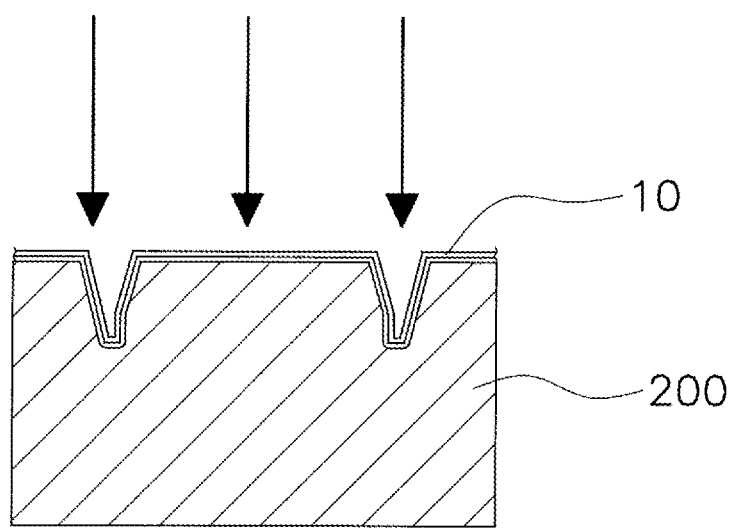
FIG. 3 is a schematic cross-sectional view of the insert molding decorative film being formed three-dimensionally.

FIGS. 2 and 3 show a process of forming the insert molding decorative film 10 in a three-dimensional shape. As shown in FIG. 2, the insert molding decorative film 10 is placed in a mold 200. The insert molding decorative film 10 is heated and softened with a heat source 210. The arrows in FIG. 2 indicate heat applied to the insert molding decorative film 10. As shown in FIG. 3, the insert molding decorative film 10 is formed in conformance with the shape of the product in the mold 200 by, for example, vacuum forming or pressure forming. The arrows in FIG. 3 indicate the direction of a force applied to the insert molding decorative film 10 in vacuum forming or pressure forming.

Figure 4:
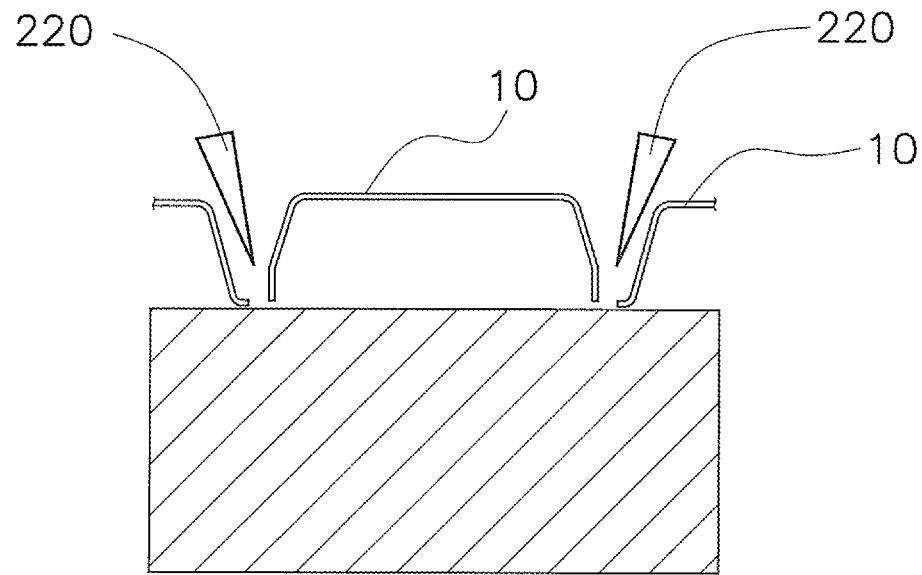
FIG. 4 is a schematic cross-sectional view of the insert molding decorative film being trimmed.

FIG. 4 shows a process of trimming an excess portion of the insert molding decorative film 10 formed in a three-dimensional shape. The film is trimmed using, for example, a die-cutting machine or a laser. FIG. 4 shows dies 220 included in the die-cutting machine and the film being trimmed using the die-cutting machine.

Figure 5:
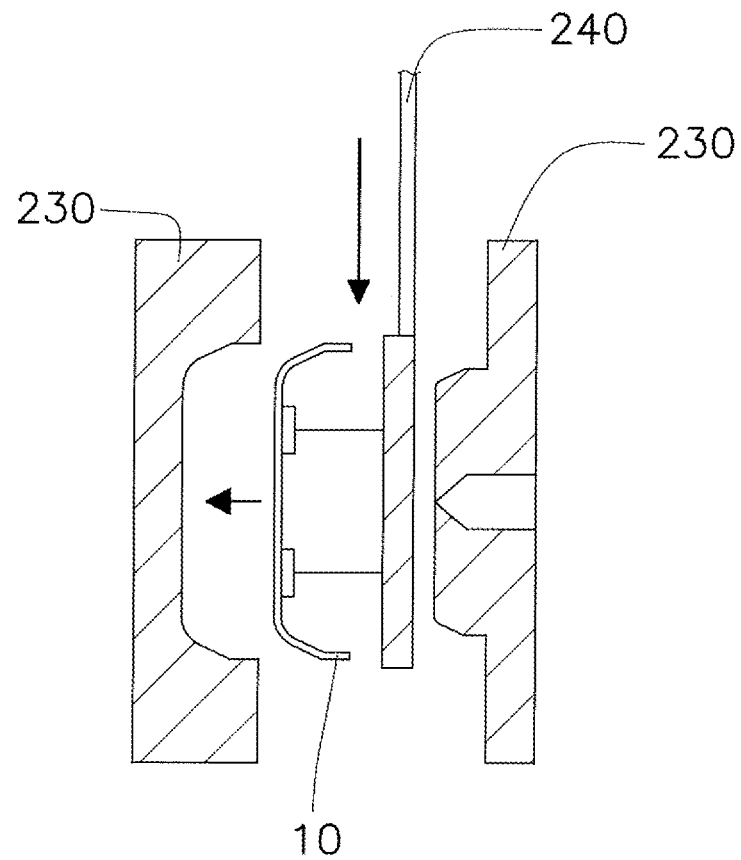
FIG. 5 is a schematic cross-sectional view of a mold and the insert molding decorative film placed in the mold.
Figure 6:
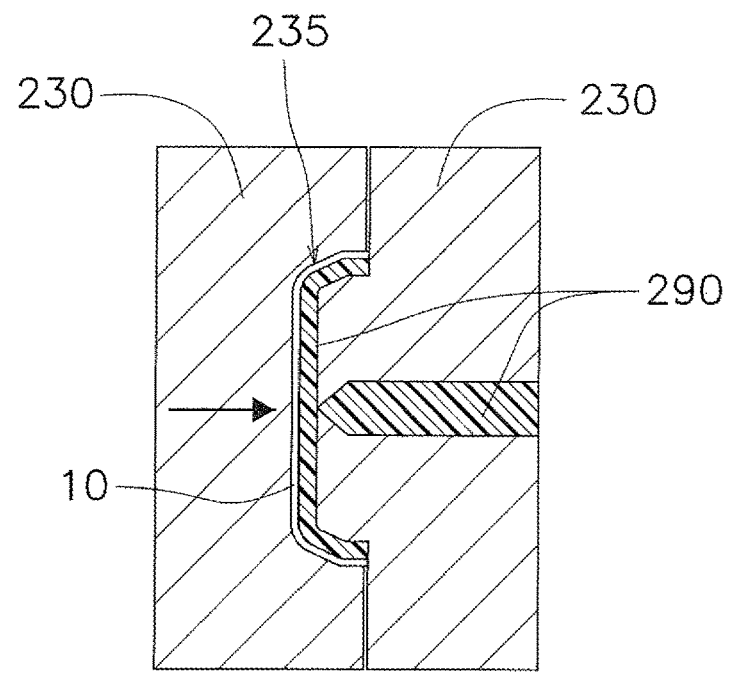
FIG. 6 is a schematic cross-sectional view of the mold filled with a molten resin after the insert molding decorative film is placed in the mold.
Figure 7:
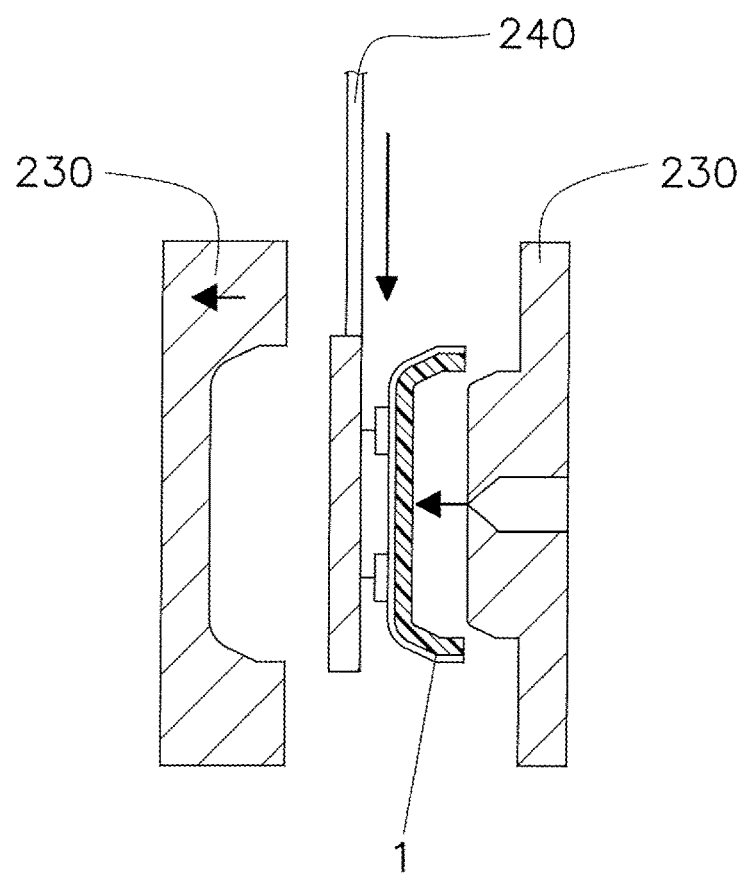
FIG. 7 is a schematic cross-sectional view of the mold and a resin molded product integral with the insert molding decorative film being retrieved from the mold.

FIGS. 5 to 7 show an example injection molding process. The injection molding process includes placing the insert molding decorative film 10 in a mold 230 and injecting a polycarbonate-based resin into the mold 230 to obtain the display panel 1 that is a polycarbonate resin molded product decorated with the insert molding decorative film 10. The display panel 1 is described herein as an example resin molded product. However, the resin molded product may not be the display panel 1. FIG. 5 shows the mold 230 being open with the insert molding decorative film 10 formed three-dimensionally and placed in the mold 230. In FIG. 5, the insert molding decorative film 10 is placed in the mold 230 with a robotic arm 240. The arrows in FIG. 5 indicate the moving direction of the insert molding decorative film 10.

FIG. 6 shows the mold 230 being closed, with a cavity 235 thereof being filled with a molten resin 290, which is a polycarbonate-based resin molten under heat. The molding temperature of the display panel 1 containing a polycarbonate-based resin as a main material (the temperature of the molten resin 290) is typically 260 to 320° C. The insert molding decorative film 10 according to a first embodiment may be molded at 300° C. or higher. The arrow in FIG. 6 indicates the movement of a movable part of the mold 230 for closing the mold 230. FIG. 7 shows the mold 230 being open and the display panel 1 being retrieved from the mold 230. The display panel 1 is a resin molded product formed from a polycarbonate-based resin. After the mold 230 is open, the robotic arm 240 enters the space in the mold 230 to retrieve the display panel 1 (resin molded product) out of the mold 230. The arrow on the mold 230 in FIG. 7 indicates the moving direction of the movable part. The arrows around the robotic arm 240 and the display panel 1 indicate the moving direction of the display panel 1 (resin molded product).

(3) Structure of Insert Molding Decorative Film 10

Figure 8A:
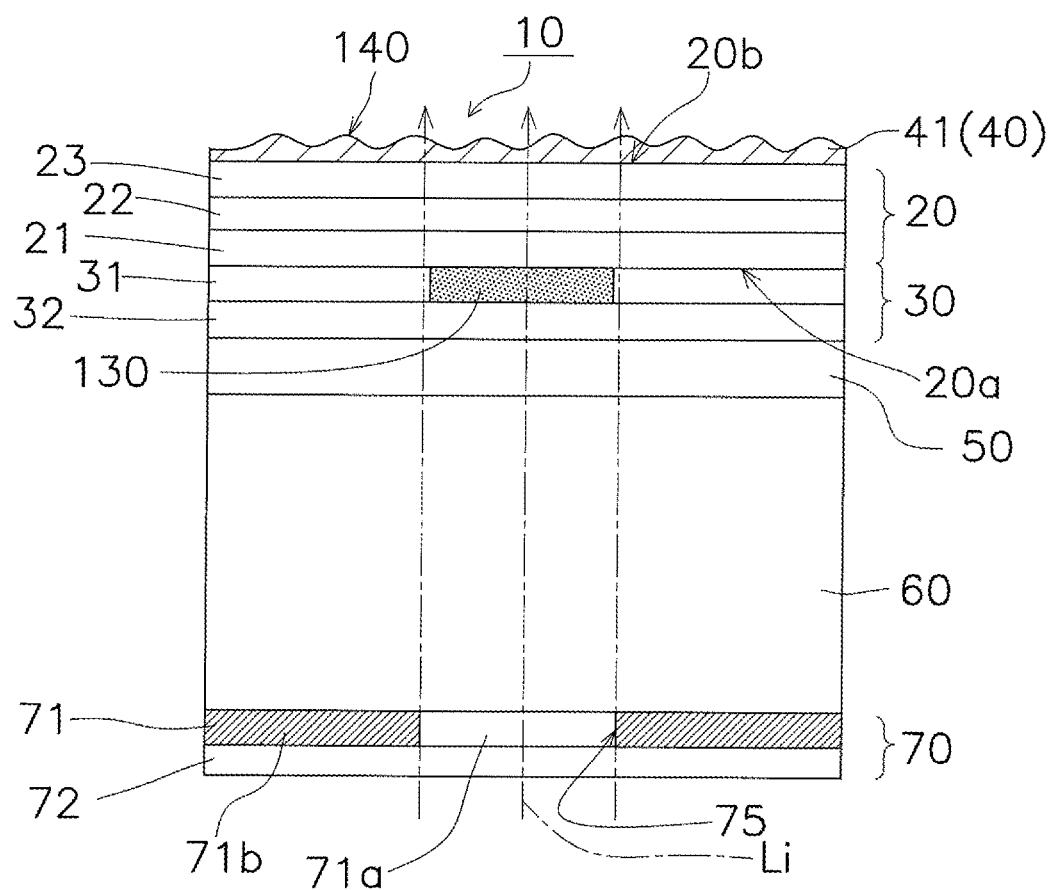
FIG. 8A is a schematic cross-sectional view of the insert molding decorative film, showing its example structure.

As shown in FIG. 8A, the insert molding decorative film 10 includes a multilayer film 20, a first gravure print layer 30, a second gravure print layer 40, a lamination adhesive layer 50, a backer film 60, and a screen print layer 70.

(3-1) Multilayer Film 20

The multilayer film 20 has a first main surface 20a and a second main surface 20b. The multilayer film 20 has a thickness of, for example, 30 to 150 μm. The multilayer film 20 with a thickness of 30 to 150 μm may be used for gravure printing. In the first embodiment, the multilayer film 20 has a thickness of, for example, 50 μm. The multilayer film 20 includes a first acrylic resin layer 21, a second acrylic resin layer 23, and a polycarbonate resin layer 22 between the first acrylic resin layer 21 and the second acrylic resin layer 23. The first acrylic resin layer 21 has the first main surface 20a being exposed. The second acrylic resin layer 23 has the second main surface 20b being exposed.

Each of the first acrylic resin layer 21 and the second acrylic resin layer 23 is formed from an acrylic-based resin. Examples of the acrylic-based resin used for each of the first acrylic resin layer 21 and the second acrylic resin layer 23 include a methyl methacrylate resin and polymethyl methacrylate (PMMA). In one or more embodiments of the present invention, each of the first acrylic resin layer 21 and the second acrylic resin layer 23 formed from an acrylic-based resin may further contain an additive.

The polycarbonate resin layer 22 is formed from a polycarbonate-based resin. Examples of the polycarbonate-based resin used for the polycarbonate resin layer 22 include a polycarbonate resin. In one or more embodiments of the present invention, the polycarbonate resin layer 22 formed from a polycarbonate-based resin may further contain an additive. To reduce the rate of film shrinkage in gravure printing, the polycarbonate resin layer 22 has a thickness less than the thickness of the multilayer film 20, and may have a thickness of 10 to 105 μm. The polycarbonate resin layer 22 has a glass transition temperature (Tg) of, for example, 120 to 200° C. For high heat resistance, the glass transition temperature (Tg) of the polycarbonate resin layer 22 may be higher, or specifically, 150 to 200° C., or more specifically, 170 to 200° C. The glass transition temperature (Tg) is measured in accordance with Japanese Industrial Standards (JIS) 7121.

The multilayer film 20 may have the rate of shrinkage of −0.20 to +0.20% in gravure printing, or specifically, −0.15 to +0.15%, in both the feeding direction and the width direction of the multilayer film 20.

(3-2) First Gravure Print Layer 30

The first gravure print layer 30 is formed on the first main surface 20a of the multilayer film 20. More specifically, the first gravure print layer 30 is printed on the first main surface 20a of the multilayer film 20 (the exposed surface of the first acrylic resin layer 21). The first gravure print layer 30 includes a first graphic layer 31 and a primer layer 32. The first graphic layer 31 is formed using known gravure ink. The gravure ink contains a binder resin, a solvent, and a colorant. Examples of the binder resin include a vinyl chloride-vinyl acetate copolymer resin, an acrylic-based resin, a polyester-based resin, and a polyurethane-based resin. The solvent to dissolve the resin is selected as appropriate for the resin. Examples of the solvent in the gravure ink include toluene, methyl ethyl ketone, ethyl acetate, and isopropyl alcohol.

The first graphic layer 31 includes, for example, the first image 130 with the wood grain pattern indicated by the curves 131 in FIGS. 1A and 1B.

The lamination adhesive layer 50 is applied to the primer layer 32. The primer layer 32 transmits visible light. Examples of the material used for the primer layer 32 include a vinyl chloride-vinyl acetate copolymer resin, an acrylic-based resin, a polyester-based resin, and a polyurethane-based resin. The primer layer 32 protects the first graphic layer 31.

(3-3) Second Gravure Print Layer 40

The second gravure print layer 40 is formed on the second main surface 20b of the multilayer film 20. More specifically, the second gravure print layer 40 is printed on the second main surface 20b of the multilayer film 20 (the exposed surface of the second acrylic resin layer 23). The second gravure print layer 40 includes a second graphic layer 41. The second graphic layer 41 is formed using known gravure ink, similarly to the first graphic layer 31. The gravure ink described above is used for the first graphic layer 31. The gravure ink used for the second gravure print layer 40 will not be described.

The second gravure print layer 40 is a matte layer. This matte layer has surface roughness (Rz measured in accordance with JIS B0601) with the distance between the highest peak and the lowest valley being a value less than 20 μm, which is visually perceivable roughness. In contrast, a matte layer providing a tactile sensation has surface roughness (Rz measured in accordance with JIS B0601) with the distance between the highest peak and the lowest valley being a value greater than or equal to 20 μm, which is visually and tactually perceivable roughness. The second gravure print layer 40 may be a matte layer with visually perceivable roughness, or may be a matte layer with visually and tactually perceivable roughness.

(3-4) Lamination Adhesive Layer 50

The lamination adhesive layer 50 is used to bond the first gravure print layer 30 and the backer film 60 together. The lamination adhesive layer 50 is thus located between the first gravure print layer 30 and the backer film 60. Examples of the adhesive used for the lamination adhesive layer 50 include a two-part curable urethane-based resin, a two-part curable polyester urethane-based resin, and a two-part curable ester-based resin. These adhesives used for the lamination adhesive layer 50 are suitable for dry lamination at a low temperature of 100° C. or lower.

When the second gravure print layer 40 has surface roughness (Rz measured in accordance with JIS B0601) with the distance between the highest peak and the lowest valley being a value greater than or equal to 20 µm, the lamination adhesive layer 50 may have a thickness greater than or equal to 16 µm. The lamination adhesive layer 50 with a thickness set as described above can reduce air entrapment after dry lamination. To prevent air entrapment, when the second gravure print layer 40 has surface roughness with the distance between the highest peak and the lowest valley being a value greater than or equal to 20 µm, the lamination adhesive layer 50 may have a thickness greater than or equal to 20 µm, or specifically, greater than or equal to 25 µm. When the second gravure print layer 40 has surface roughness with the distance between the highest peak and the lowest valley being a value greater than or equal to 20 µm, the lamination adhesive layer 50 may have a thickness less than or equal to 30 µm. The lamination adhesive layer 50 with a thickness greater than 30 µm may produce foam or reduce the surface hardness during the forming process.

In other words, to reduce air entrapment, the lamination adhesive layer 50 may have a thickness of at least 80% of the distance between the highest peak and the lowest valley of the surface roughness of the second gravure print layer 40. To prevent air entrapment, the lamination adhesive layer 50 may have a thickness greater than or equal to the distance between the highest peak and the lowest valley of the surface roughness of the second gravure print layer 40, or specifically, 1.25 times the distance between the highest peak and the lowest valley of the surface roughness. However, the lamination adhesive layer 50 has a thickness set to greater than or equal to 3 µm independently of the distance between the highest peak and the lowest valley of the surface roughness of the second gravure print layer 40.

The second main surface 20b of the multilayer film 20 may have a portion including the second gravure print layer 40 and the other portion including no second gravure print layer 40. In this case, the roughness of the second gravure print layer 40 is to be the distance from the second main surface 20b of the multilayer film 20 to the surface of the second gravure print layer 40.

(3-5) Backer Film 60 and Screen Print Layer 70

The backer film 60 is formed from a polycarbonate-based resin transmissive to visible light. The backer film 60 has a thickness of, for example, 150 to 250 µm.

The screen print layer 70 is formed on the backer film 60 by screen printing. The screen print layer 70 includes the light-transmissive patterned layer 71 and an insert molding adhesive layer 72. The light-transmissive patterned layer 71 includes a screen-printed shield portion 71b for blocking visible light and a light-transmissive portion 71a with no shield portion 71b printed. The light-transmissive portion 71a may include, for example, a semitransparent area to display the icon 75b in color. The light-transmissive portion 71a may include, for example, a semitransparent area that transmits blue visible light to display the icon 75b in blue.

The light-transmissive pattern 75 in the light-transmissive patterned layer 71 is aligned with the first image 130 when the light-transmissive patterned layer 71 is printed. The light-transmissive pattern 75 aligned in this manner allows visible light passing through the light-transmissive pattern in the light-transmissive patterned layer 71 to pass through predetermined portions of the first graphic layer 31 and the second graphic layer 41. As shown in FIG. 1B, the first image 130 transmissive to visible light or the first image 130 surrounded by a portion transmissive to visible light is to be formed at a predetermined position on the display panel 1 (resin molded product), which is an object to be decorated, with high dimensional accuracy. Similarly, the second image 140 transmissive to visible light or the second image 140 surrounded by a portion transmissive to visible light is to be formed at a position with respect to the first image 130 with high dimensional accuracy.

Figure 8B:
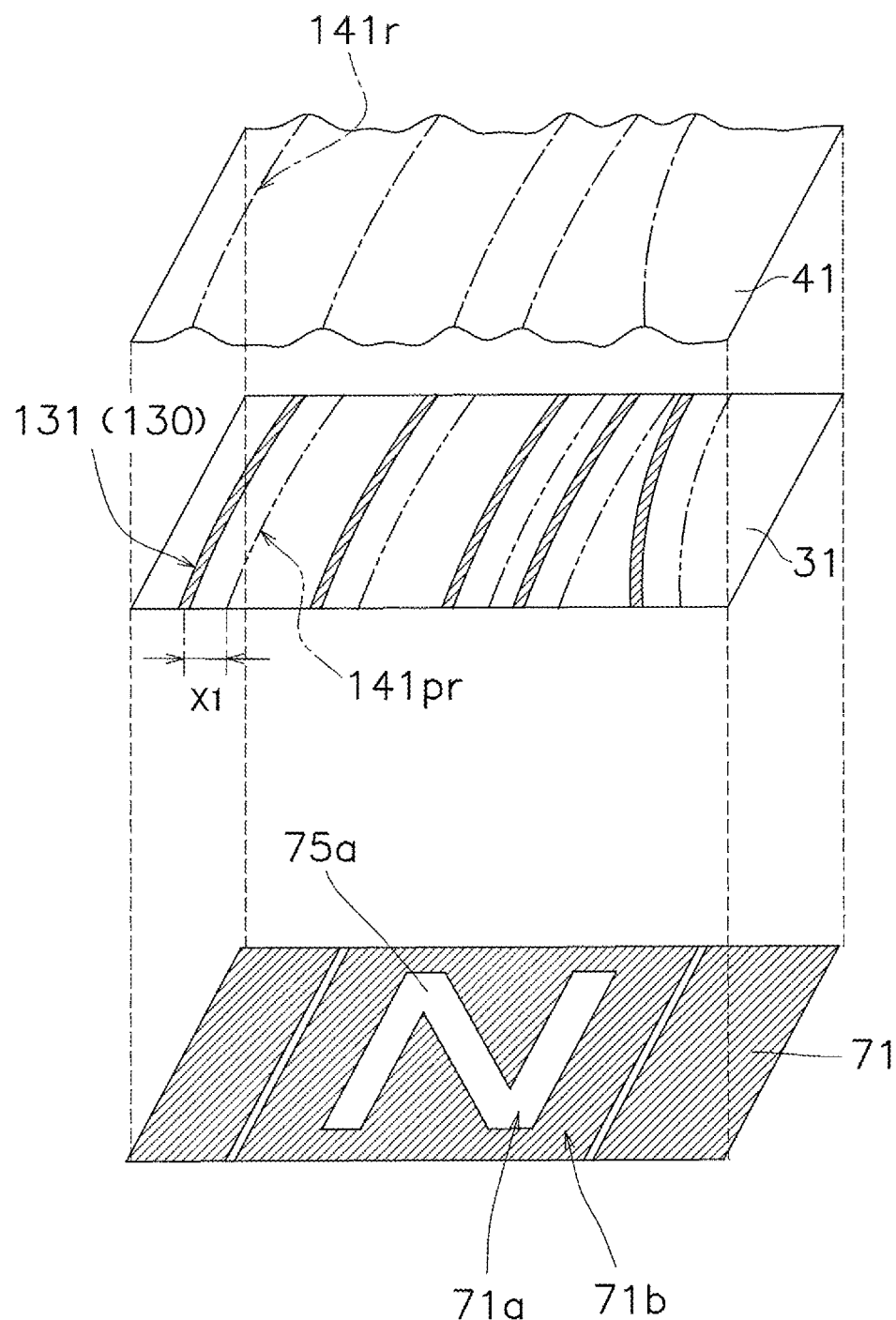
FIG. 8B is an enlarged schematic exploded perspective view of parts of multiple layers in the display panel, describing the arrangement of a first image in a first graphic layer, a second image in a second graphic layer, and a light-transmissive pattern in the display panel.

FIG. 8B shows parts of the curves 131 as an example of the first image 130, and a part of the rough wood grain pattern 141 as an example of the second image 140. The first graphic layer 31 including the curves 131 and the second graphic layer 41 including the rough wood grain pattern 141 are aligned with each other, and thus the curves 131 and the rough pattern 141 are aligned with each other. FIG. 8B shows the curves 131 with a specific width indicating the portions colored in dark brown. For the first graphic layer 31 and the second graphic layer 41 with optimum alignment, convex portions of the rough pattern 141 have ridgelines 141r (indicated by the dot-dash lines in FIG. 8B) aligned with the center lines of the curves 131 as viewed in plan. Being viewed in plan herein refers to being viewed in a direction in which visible light passes.

As an example of a defective product, a product with projection lines 141pr as the ridgelines 141r projected onto the first graphic layer 31 may deviate to positions indicated by the two-dot-dash lines in FIG. 8B. The projection lines 141pr deviate in the tangential direction of the curves 131 shown in FIG. 8B. A distance X1 shown in FIG. 8B indicates the distance by which a projection line 141pr deviates from the center line of the corresponding curve 131. The larger distance X1 causes a difference in sensation between the pattern perceived by a user touching the display panel 1 by hand and the pattern visually perceived by the user. A larger difference in sensation can cause the display panel 1 to have no commercial value. The distance X1 may thus be less than or equal to ±0.5 mm. Although the deviation in the tangential direction of the curves 131 shown in FIG. 8B is described above, the deviation in a direction perpendicular to the tangential direction may also be less than or equal to ±0.5 mm. Such deviation may be reduced in any direction defined as appropriate, other than the directions described above.

The alphabets 75a, the icon 75b, the display 75c, and the rectangular pattern 75d are, for example, at predetermined positions with respect to the flat portion 2 of the display panel 1. Thus, the alphabets 75a, the icon 75b, the display 75c, and the rectangular pattern 75d are aligned with the first graphic layer 31 or the second graphic layer 41. For example, the display panel 1 with the display 75c printed in a manner oblique to and misaligned with the second end 2b of the flat portion 2 of the display panel 1 may be a defective product.

(4) Method for Manufacturing Insert Molding Decorative Film 10

Figure 9:
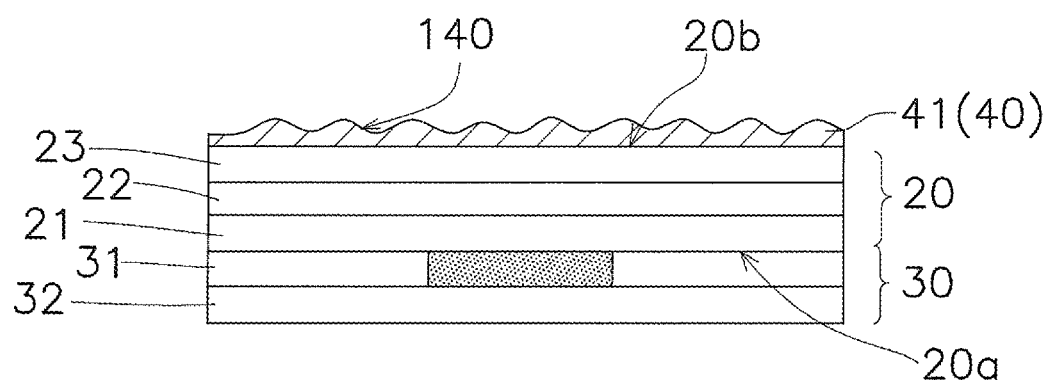
FIG. 9 is a schematic cross-sectional view of an example multilayer film with a printed gravure print layer.
Figure 10:
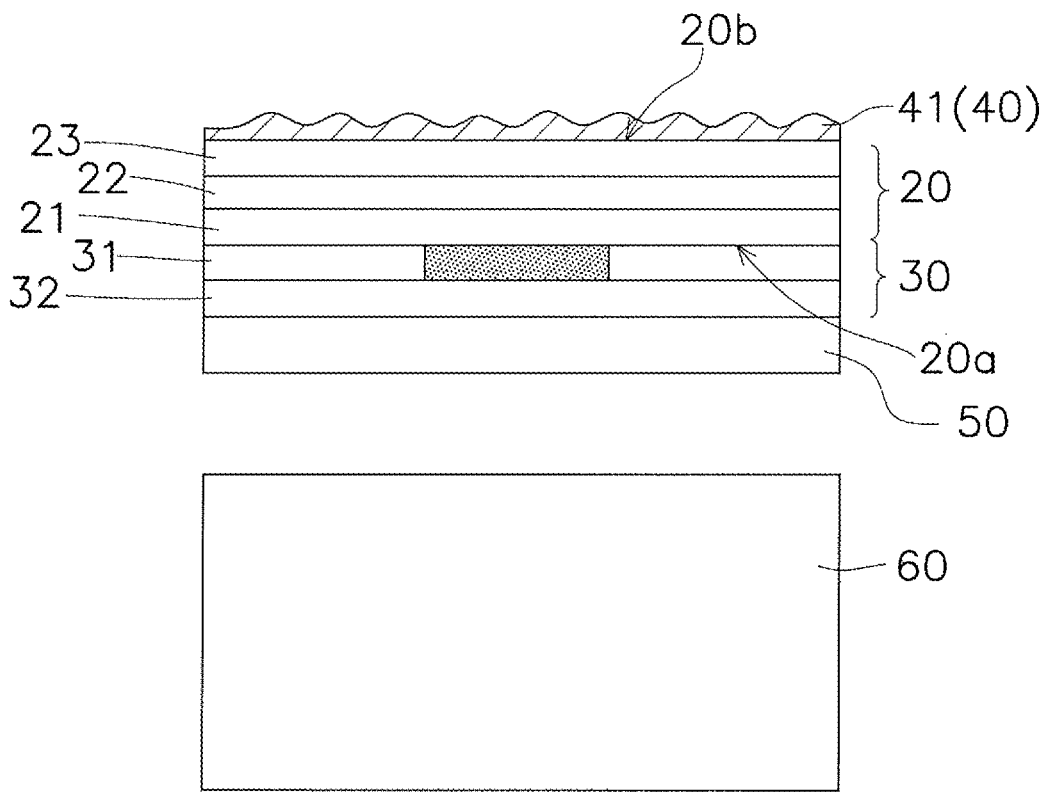
FIG. 10 is a schematic cross-sectional view of the multilayer film and a backer film to be dry laminated in a dry laminating step.
Figure 11:
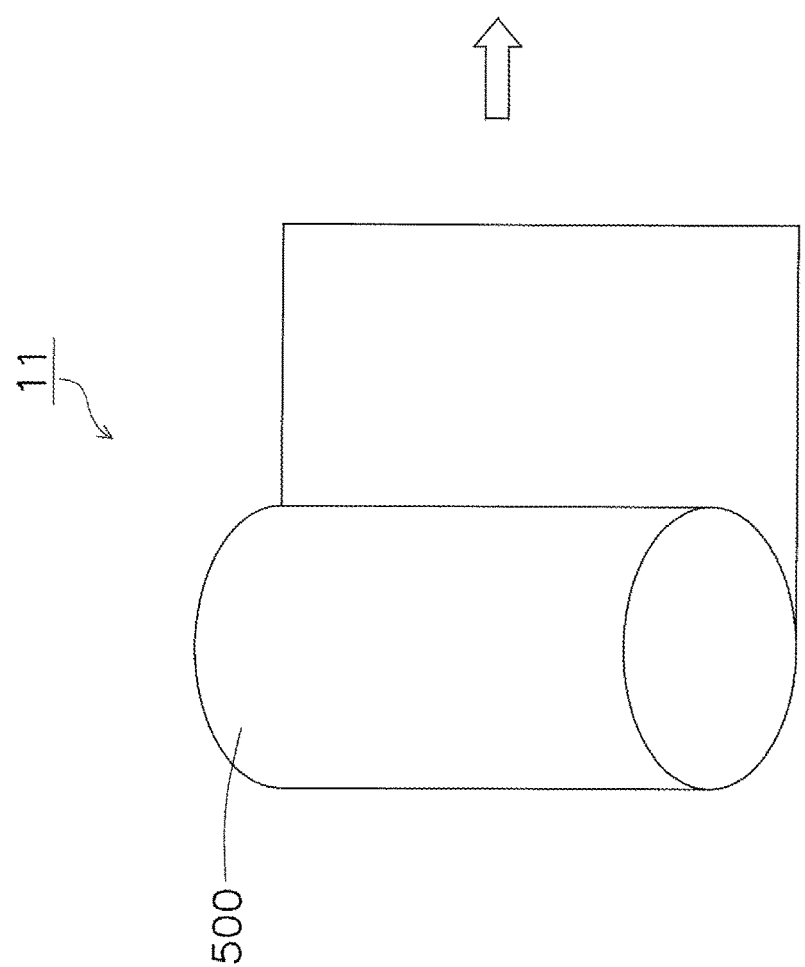
FIG. 11 is a schematic diagram of a member of the insert molding decorative film being cut in a cutting step.

FIGS. 9 to 11 show an example method for manufacturing the insert molding decorative film 10. FIGS. 9 and 10 each show a partial cross section of an elongated sheet. In a first step, as shown in FIG. 9, the first gravure print layer 30 is formed on the first main surface 20a of the multilayer film 20, and the second gravure print layer 40 is formed on the second main surface 20b of the multilayer film 20 by gravure printing. More specifically, the first graphic layer 31 and the second graphic layer 41 are first printed on the multilayer film 20 at the same time by gravure printing. The first graphic layer 31 and the second graphic layer 41 printed at the same time may have less misalignment resulting from printing. The primer layer 32 is then printed on the first graphic layer 31 by gravure printing.

The first step includes, after printing of the first gravure print layer 30 and the second gravure print layer 40, heat treatment performed at a temperature higher than the evaporation temperature of the solvent in the gravure ink used for the first gravure print layer 30 and the second gravure print layer 40. After the heat treatment, the gravure ink contains less residual solvent than before the heat treatment.

A second step includes forming the lamination adhesive layer 50 and lamination. In forming the lamination adhesive layer 50, an adhesive transmissive to visible light is applied to the gravure-printed multilayer film 20 shown in FIG. 9 with roll-to-roll processing to form the lamination adhesive layer 50. Although the lamination adhesive layer 50 is formed on the gravure-printed multilayer film 20 in the present embodiment, the lamination adhesive layer 50 may be formed on the backer film 60.

The gravure-printed multilayer film 20 and the backer film 60 are then dry laminated with the lamination adhesive layer 50 at a low temperature lower than or equal to 100° C. with roll-to-roll processing.

As shown in FIG. 11, a first member 11 is a roll 500 immediately after dry lamination. In a subsequent step, a sheet 510 is produced from the first member 11 as the roll 500 as shown in FIG. 11. The sheet 510 is a second member with a shorter length. The sheet 510 may be produced by, for example, slitting or cutting. In other words, the elongated first member 11 unrolled from the roll 500 is cut into the sheet 510 (second member) with a predetermined shorter length. The step of producing the sheet 510, which is the shorter second member, from the elongated first member 11 is a third step.

In a subsequent fourth step of screen printing, the screen print layer 70 is formed on the backer film 60 in the first member 11 as a sheet. The light-transmissive patterned layer 71 is printed on the backer film 60 by screen printing using known screen printing ink. The light-transmissive patterned layer 71 includes the screen-printed shield portion 71*b* for blocking visible light and the light-transmissive portion 71*a* with no shield portion 71*b* printed. The light-transmissive pattern 75 in the light-transmissive patterned layer 71 is aligned with the first image 130 in the first graphic layer 31 and the second image 140 in the second graphic layer 41 when the light-transmissive patterned layer 71 is printed. Thus, as shown in FIG. 8A, visible light Li passing through the light-transmissive pattern 75 passes through the first image 130 in the first graphic layer 31 at a predetermined position. The visible light Li passing through the light-transmissive pattern 75 passes through the second image 140 in the second graphic layer 41 formed with respect to the first image 130. The sheet 510 can be used to accurately align the light-transmissive pattern 75 in the light-transmissive patterned layer 71 with the first image 130 in the first graphic layer 31 and the second image 140 in the second graphic layer 41.

Further, the insert molding adhesive layer 72 is printed on the light-transmissive patterned layer 71 by screen printing. Examples of the material used for the insert molding adhesive layer 72 include a vinyl chloride-vinyl acetate copolymer resin, a polyester-based resin, an acrylic-based resin, a urethane-based resin, and a polycarbonate-based resin.

(5) Modifications (5-1) Modification A

In the above embodiment, the second gravure print layer 40 is formed on the surface (second main surface 20*b*) of the multilayer film 20 to manufacture the display panel 1. In some embodiments, the multilayer film 20 including no second gravure print layer 40 may also be used to manufacture the display panel 1, which is a resin molded product.

(5-2) Modification B

Figure 12:
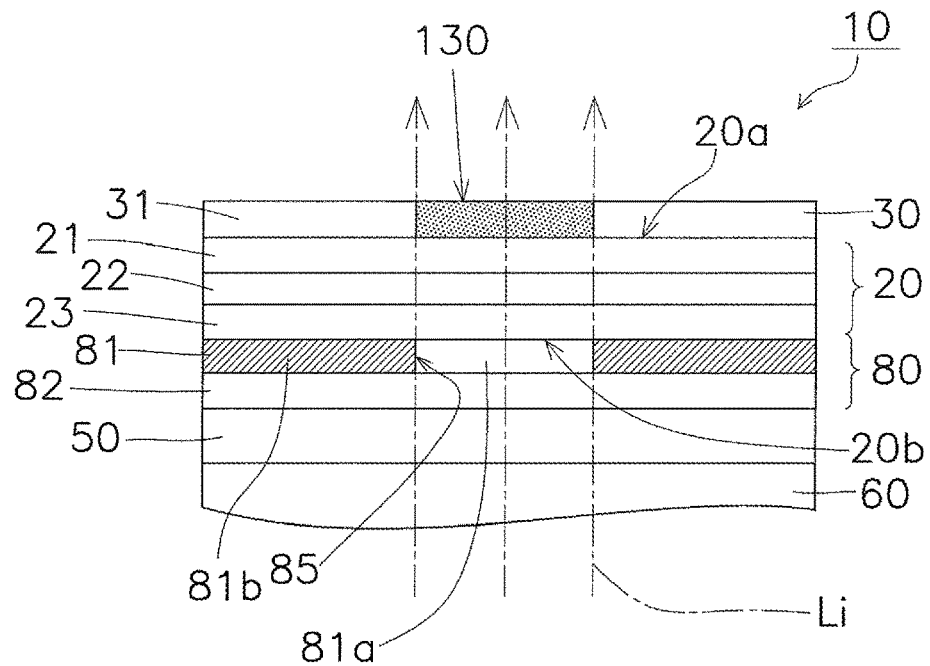
FIG. 12 is a schematic cross-sectional view of another example multilayer film with a printed gravure print layer.

In the above embodiment, the first gravure print layer 30 includes the first graphic layer 31, and the second gravure print layer 40 includes the second graphic layer 41. In some embodiments, as shown in FIG. 12, a second gravure print layer 80 may include a light-transmissive patterned layer 81. In this case, the lamination adhesive layer 50 and a primer layer 82 are located between the light-transmissive patterned layer 81 and the backer film 60. In the example of the insert molding decorative film 10 shown in FIG. 12, the light-transmissive patterned layer 81 and the primer layer 82 are formed by gravure printing. The light-transmissive patterned layer 81 may be formed from the same material as the first graphic layer 31. The primer layer 82 may be formed from the same material as the primer layer 32.

The light-transmissive patterned layer 81 in the second gravure print layer 80 includes a light-transmissive pattern 85 including the oval icon 75*b* shown in FIG. 8B. In this example, the light-transmissive pattern 85 includes a gravure-printed shield portion 81*b* for blocking visible light and a light-transmissive portion 81*a* including no shield portion 81*b* printed and including a printed semitransparent portion. The shield portion 81*b* has the same function as the shield portion 71*b*. The light-transmissive portion 81*a* has the same function as the light-transmissive portion 71*a*.

(5-3) Modification C

In the above embodiment, the sheet 510, which is the shorter second member, is produced from the elongated first member 11 in the third step preceding the fourth step. In some embodiments, the elongated first member 11 may be used to form the light-transmissive patterned layer 71 on the backer film 60 in the first member 11 with roll-to-roll processing. The light-transmissive patterned layer 71 can be formed on the backer film 60 by screen printing. With roll-to-roll processing, the elongated first member 11 can be used without being cut, thus allowing the light-transmissive patterned layer 71 to be formed quickly.

(5-4) Modification D

Figure 13:
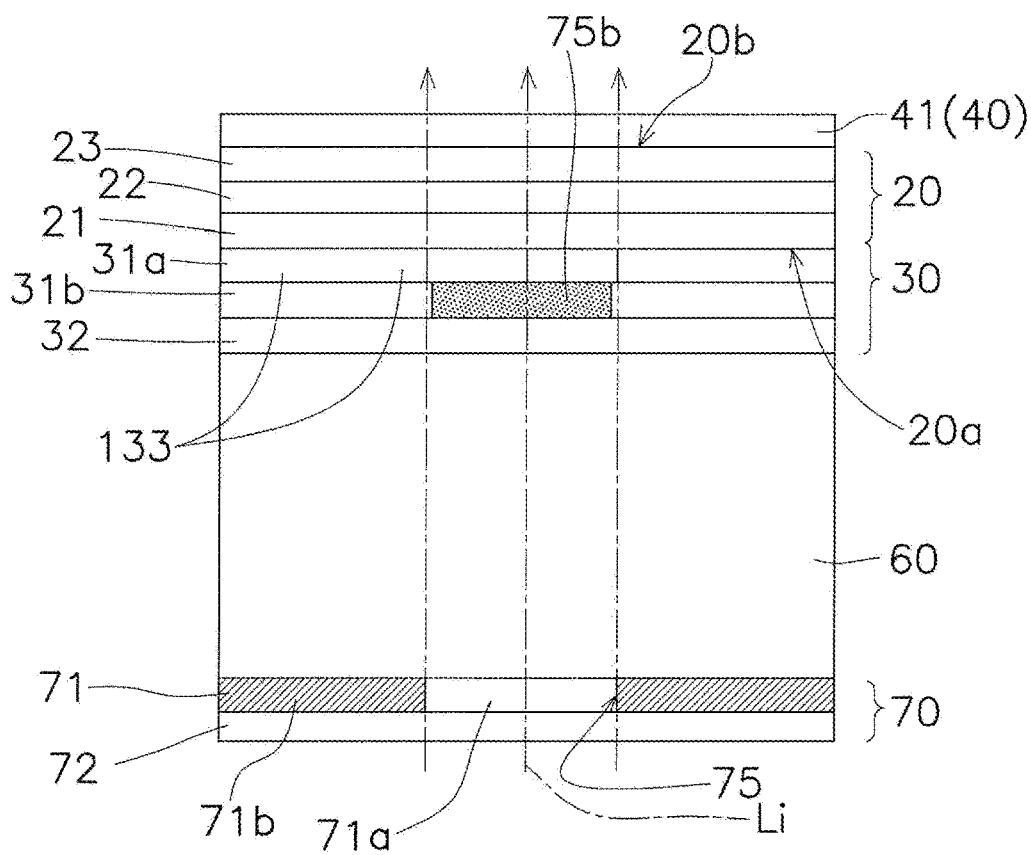
FIG. 13 is a schematic cross-sectional view of still another example multilayer film with a printed gravure print layer.

The second gravure print layer 40 may be a print layer other than a matte layer as shown in FIG. 13.

The insert molding decorative film 10 shown in FIG. 13 includes the first gravure print layer 30 including two first graphic layers 31*a* and 31*b*. The first graphic layer 31*a* includes, for example, a printed graphic element that mainly appears when no visible light Li passes though the layer. The first graphic layer 31*b* is located farther from the multilayer film 20 than the first graphic layer 31*a*. Thus, when the insert molding decorative film 10 is viewed from the second gravure print layer 40 without any visible light Li being applied, the printed graphic element in the first graphic layer 31*a* is mainly visible. For example, the icon 75*b* is printed on the first graphic layer 31*b* behind the first graphic layer 31*a* with a wood grain pattern. In response to the visible light Li being applied, the icon 75*b* emerges. The graphic element in the first graphic layer 31*a* and a graphic element in the second graphic layer 41 shown in FIG. 13 may be misaligned by ±0.5 mm inclusive. A graphic element in the first graphic layer 31*b* and the graphic element in the second graphic layer 41 shown in FIG. 13 may be misaligned by ±0.5 mm inclusive.

(6) Features (6-1)

In the insert molding decorative film 10 described above, the multilayer film 20 includes the first acrylic resin layer 21 containing an acrylic-based resin, the second acrylic resin layer 23 containing an acrylic-based resin, and the polycarbonate resin layer 22 containing a polycarbonate-based resin between the first acrylic resin layer 21 and the second acrylic resin layer 23, and is transmissive to visible light. The multilayer film 20 with this multilayer structure including the polycarbonate resin layer 22 is less likely to shrink when the first gravure print layer 30 is printed and dried. The polycarbonate resin layer 22 in the multilayer film 20 and the backer film 60 containing a polycarbonate-based resin increase the heat resistance and reduce ink flow in the first gravure print layer 30 in manufacturing the polycarbonate display panel 1 (an example of a resin molded product). Visible light can thus be accurately guided through the light-transmissive pattern 75 to the first image 130 in the first gravure print layer 30. In this manner, the first image 130 transmissive to visible light can be accurately formed in an intended portion of the display panel 1.

The ink flow refers to melting of the resin used for printing at high temperature.

(6-2)

The multilayer film 20 with the multilayer structure including the polycarbonate resin layer 22 described above is less likely to shrink when the second gravure print layer 40 or 80, in addition to the first gravure print layer 30, is printed and dried. The polycarbonate resin layer 22 in the multilayer film 20 and the backer film 60 containing a polycarbonate-based resin increase the heat resistance and reduce ink flow not only in the first gravure print layer 30 but also in the second gravure print layer 40 or 80 in manufacturing the polycarbonate display panel 1.

In particular, the first gravure print layer 30 and the second gravure print layer 40 or 80 formed at the same time by gravure printing allow the first image 130 and the second image 140 or the first image 130 and the light-transmissive pattern 85 to have far less misalignment. The first image 130 in the first gravure print layer 30 can be accurately aligned with the positions of the second image 140 in the second gravure print layer 40 and the light-transmissive pattern 85 in the second gravure print layer 80. Thus, the second image 140 in the second gravure print layer 40 can be accurately formed with respect to the first image 130, or the first image 130 can be formed at an intended position of the display panel 1 (an example of a resin molded product), allowing the visible light Li to pass through the first image 130 accurately.

(6-3)

In the insert molding decorative film 10 described above, the second gravure print layer 40 may have surface roughness with the distance between the highest peak and the lowest valley being a value greater than or equal to 20 μm, and the lamination adhesive layer 50 may have a thickness greater than or equal to 16 μm. The insert molding decorative film 10 with this structure can reduce air entrapment caused by the roughness of the second gravure print layer 40 with the lamination adhesive layer 50.

(6-4)

The insert molding decorative film 10 described above may include the first gravure print layer 30 including, between the first graphic layer 31 and the lamination adhesive layer 50, the primer layer 32 containing a thermoplastic resin and transmissive to visible light. In the insert molding decorative film 10 with this structure, the first graphic layer 31 is protected by the primer layer 32.

Although the embodiment of the present invention has been described, the present invention is not limited to the embodiment, and may be changed in various manners without departing from the spirit and scope of the present invention. The embodiment and modifications described herein can be combined in any manner as appropriate.

REFERENCE CHARACTER LIST 1 display panel (example of resin molded product)
10 insert molding decorative film
20 multilayer film
21 first acrylic resin layer
22 polycarbonate layer
23 second acrylic resin layer
30 first gravure print layer
31 first graphic layer
32 primer layer
40, 80 second gravure print layer
41 second graphic layer
50 lamination adhesive layer
60 backer film
70 screen print layer
71, 81 light-transmissive patterned layer
75, 85 light-transmissive pattern
130 first image
140 second image

The invention claimed is:

1. A decorative film for insert molding to be formed in a three-dimensional shape before insert molding, the decorative film comprising:
- a multilayer film having a first main surface and a second main surface, the multilayer film including a first acrylic resin layer comprising an acrylic-based resin, a second acrylic resin layer comprising an acrylic-based resin, and a polycarbonate resin layer between the first acrylic resin layer and the second acrylic resin layer, the polycarbonate resin layer comprising a polycarbonate-based resin, the multilayer film being transmissive to visible light;
- a first gravure print layer on the first main surface of the multilayer film, the first gravure print layer including a first graphic layer including a gravure-printed graphic element, the first gravure print layer being transmissive to visible light;
- a second gravure print layer on the second main surface of the multilayer film;
- a lamination adhesive layer bonded to the first gravure print layer, the lamination adhesive layer including an adhesive transmissive to visible light;
- a backer film comprising a polycarbonate-based resin, the backer film being bonded to the first gravure print layer with the lamination adhesive layer by dry laminating, the backer film being transmissive to visible light; and
- a light-transmissive patterned layer formed by screen printing on the backer film, the light-transmissive patterned layer including a light-transmissive pattern transmissive to visible light, wherein
the first graphic layer includes a first image at a predetermined position,
the light-transmissive pattern in the light-transmissive patterned layer is patterned to allow visible light to pass through the first image at the predetermined position,
the second gravure print layer has surface roughness measured in accordance with Japanese Industrial Standards B0601, and the surface roughness has a distance between a highest peak and a lowest valley being greater than or equal to 20 μm, and
the lamination adhesive layer has a thickness greater than or equal to 16 μm.

2. The decorative film according to claim 1, wherein
the second gravure print layer includes a second graphic layer including a gravure-printed graphic element, the second gravure print layer including a second image at a position with respect to the first image.

3. The decorative film according to claim 1, wherein
the first gravure print layer includes a primer layer between the first graphic layer and the lamination adhesive layer, the primer layer comprises a thermoplastic resin, and the primer layer is transmissive to visible light.

4. The decorative film according to claim 1, wherein the light-transmissive patterned layer is formed on an opposite side of the backer film from the first gravure print layer.

5. The decorative film according to claim 1, wherein the backer film has a thickness of 150 μm to 250 μm.

6. A method for manufacturing a decorative film for insert molding to be formed in a three-dimensional shape before insert molding, the method comprising:
- printing, by gravure printing, a first gravure print layer transmissive to visible light on a first main surface of a multilayer film, the multilayer film including a first acrylic resin layer comprising an acrylic-based resin, a second acrylic resin layer comprising an acrylic-based resin, and a polycarbonate resin layer between the first acrylic resin layer and the second acrylic resin layer, the polycarbonate resin layer comprising a polycarbonate-based resin, the multilayer film being transmissive to visible light;
- printing, by gravure printing, a second gravure print layer on a second main surface of the multilayer film;
- forming an elongated first member by dry laminating a backer film and the multilayer film including the first gravure print layer at a temperature of 100° C. or lower, with a lamination adhesive layer placed between the backer film and the multilayer film, the backer film comprising a polycarbonate-based resin and being transmissive to visible light; and
- forming a light-transmissive patterned layer on the backer film in the first member by screen printing, the light-transmissive patterned layer including a light-transmissive pattern transmissive to visible light, wherein the first gravure print layer includes a first image at a predetermined position in the three-dimensional shape of the decorative film formed in the three-dimensional shape, the light-transmissive pattern in the light-transmissive patterned layer is patterned to allow visible light to pass through the first image at the predetermined position in the three-dimensional shape, the second gravure print layer has surface roughness measured in accordance with Japanese Industrial Standards B0601, and the surface roughness has a distance between a highest peak and a lowest valley being greater than or equal to 20 μm, and the lamination adhesive layer has a thickness greater than or equal to 16 μm.

7. The method according to claim 6, wherein
the printing the first gravure print layer and the printing the second gravure print layer are performed at a same time.

8. The method according to claim 6, further comprising:
cutting the first member into a shorter second member before the forming the light-transmissive patterned layer,
wherein the forming the light-transmissive patterned layer includes forming the light-transmissive patterned layer on the backer film in the second member.

9. The method according to claim 6, wherein
the forming the light-transmissive patterned layer includes forming the light-transmissive patterned layer on the backer film in the first member with roll-to-roll processing.

10. The method according to claim 6, wherein forming the light-transmissive patterned layer comprises forming the light-transmissive patterned layer on an opposite side of the backer film from the first gravure print layer.

11. A method for manufacturing a resin molded product, the method comprising:
- forming the decorative film according to claim 1 in a three-dimensional shape;
- trimming an excess portion of the decorative film formed in the three-dimensional shape; and
- injecting a polycarbonate-based resin into a mold with the decorative film placed in the mold to obtain a polycarbonate resin molded product decorated with the decorative film and transmissive to visible light,
wherein the resin molded product has a three-dimensional shape with a specific portion including the first image and allows visible light passing through the light-transmissive pattern to pass through the first image or a portion adjacent to the first image.

* * * * *